(12) United States Patent
Denz

(10) Patent No.: US 6,295,486 B1
(45) Date of Patent: Sep. 25, 2001

(54) METHOD AND ARRANGEMENT FOR DETECTING A MEASUREMENT QUANTITY IN A VEHICLE

(75) Inventor: Helmut Denz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/573,678

(22) Filed: May 19, 2000

(30) Foreign Application Priority Data

May 19, 1999 (DE) ............................................. 199 22 906

(51) Int. Cl.[7] ............................................. G05D 17/00
(52) U.S. Cl. ............................................. 701/1; 701/34; 701/70
(58) Field of Search ............................................. 701/1, 34, 70; 123/319; 340/428

(56) References Cited

U.S. PATENT DOCUMENTS 5,383,123 * 1/1995 Kunz ............................................. 701/37
5,485,417 * 1/1996 Wolf et al. ............................................. 701/37

FOREIGN PATENT DOCUMENTS 4040636   8/1992   (DE).

* cited by examiner

Primary Examiner—William A. Cuchlinski, Jr.
Assistant Examiner—Yonel Beaulieu
(74) Attorney, Agent, or Firm—Walter Ottesen

(57) ABSTRACT

A method and an arrangement are provided for detecting the measurement quantity in a vehicle, which is characterized by at least one extreme value. The measurement quantity is evaluated for the control in combination with a vehicle while considering the extreme value. This extreme value is adapted. The adaptation is only enabled under pregiven conditions. When these conditions are present, the method and arrangement proceed on the premise of a measurement quantity which is uninfluenced by factors which make this measurement quantity incorrect.

18 Claims, 6 Drawing Sheets

METHOD AND ARRANGEMENT FOR DETECTING A MEASUREMENT QUANTITY IN A VEHICLE

Background of the Invention

A method and an arrangement for detecting a measurement quantity in a vehicle is disclosed in German patent publication 4,040,636. Here, the detection of a measurement quantity is described which is characterized by at least one extreme value which, for example, is pregiven by an end position. This extreme value changes in the course of time so that it is necessary that the extreme value track the changes in order to maintain the needed accuracy of the detection of the measurement quantity. For this reason, a storage value, which represents the extreme value, is corrected under specific conditions at least when the current measurement quantity exceeds or drops below the extreme value in that it tracks the actual measurement quantity with a delay (downward adaptation). With the actuation of the brake pedal, the stored value is changed in the opposite direction (upward adaptation). This procedure ensures that the detection of the measurement quantity retains the necessary accuracy on the basis of the current measurement quantity and the stored extreme value. This procedure has special significance in the detection of the position of an operator-controlled element actuated by the driver such as an accelerator pedal or brake pedal and/or an actuating element such as a throttle flap. It is ensured that defectively stored extreme values do not lead to a malfunction via the upward adaptation when actuating the brake. However, this is true only for the actuation of a brake pedal. This situation does not occur sufficiently often possibly during vehicle operation.

SUMMARY OF THE INVENTION

It is an object of the invention to provide measures which contribute to an improvement of the detection of the measurement quantities especially with respect to a defectively stored extreme value of the measurement quantity.

The method of the invention is for detecting a measurement quantity in a motor vehicle, the measurement quantity having an extreme value. The method includes the steps of: detecting the measurement quantity; evaluating the measurement quantity while considering the extreme value for control in combination with a vehicle; enabling an adaptation of the extreme value only under pregiven conditions which, when present, permit the measurement quantity to be unaffected by factors which make the measurement quantity incorrect; and, adapting the extreme value.

In the procedure described below, it is effectively prevented that defective extreme values are detected during the learning process of an extreme value of a measurement quantity and form the basis of the computation of the measurement quantity, that is, it is ensured that the defectively learned extreme values are corrected with sufficient rapidity. This is achieved in that the detection of the at least one extreme value of the measurement quantity is permitted only under specific conditions wherein error conditions in the region of the measurement device are virtually precluded.

When two redundant measurement devices are present, it is especially advantageous that an adaptation of at least one of the extreme values does not take place when a defect in the region of at least one measuring device is recognized. For example, such defects are recognized because of deviations in the synchronism of the two measurement signal quantities and/or steep gradients of the measurement quantity signals.

It is especially advantageous that the increased transfer resistance between track and pickup occurring because of rubbed-off material on the potentiometer track has no influence on the adaptation because the adaptation of the extreme value of the measurement quantity of a measuring device takes place at an upper limit of the extreme value range (for example the idle range) of the measurement quantity of another measuring device. Because of this procedure, the stored extreme value of a detected measurement quantity does not lie at the actual extreme value at which the rubbed-off material is formed but in a region which is still part of the extreme value range (that is, only a slight loss of accuracy occurs with the formation of the measurement quantity value) but lies outside of the wear region and is still adapted to the actual changes of the extreme value.

Overall, all significant disturbance influences on the determination of the extreme value of a measurement quantity are negligible with the procedure described hereinafter in an advantageous manner.

When executing the adaptation of the extreme value of the one measurement quantity at the upper limit of the extreme value range of the other measurement quantity, a redundant certainty of the information derived from this extreme value (for example, idle condition) is present so that this information is more precise and reliable.

A further improvement is seen in that the adaptation is executed only when the brake pedal is actuated. If this is applied also in the adaptation at the end of the extreme value range, a further improvement of the adaptation is achieved with the view of the defective adaptations caused by the transfer resistance.

It is especially advantageous when at least one of the measurement quantities for idle detection is utilized, that is, for detecting a released accelerator pedal, brake pedal or a throttle flap in idle position. In this case, the least possible lost motion is achieved in the measurement quantity even when high transfer resistances are present.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
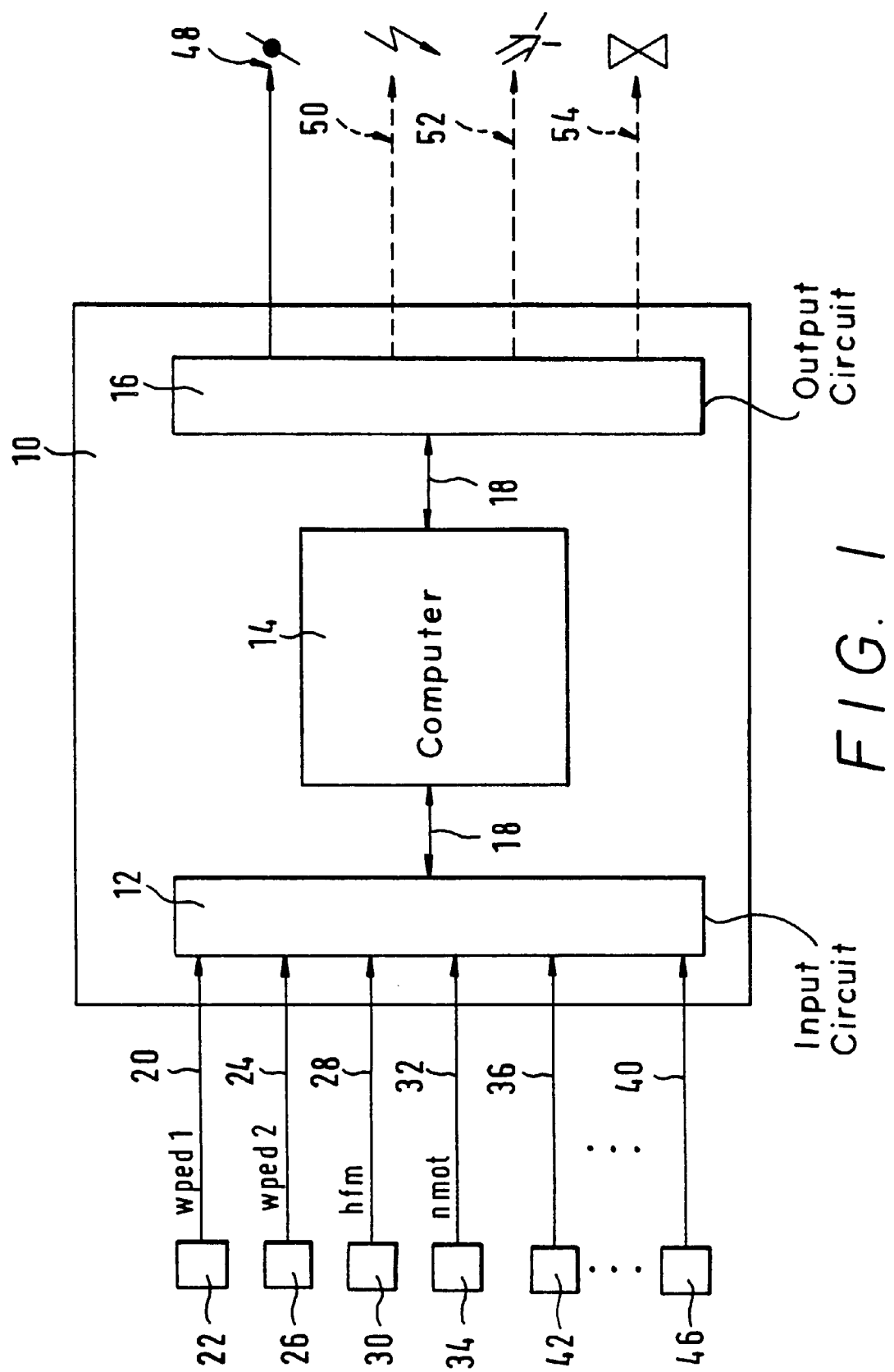
FIG. 1 is an overview circuit diagram of a control arrangement for detecting a measurement quantity in a vehicle with the control arrangement evaluating the measurement quantity for controlling a drive unit such as an internal combustion engine of a vehicle.

FIG. 1 shows an electronic control apparatus 10 which has at least one input circuit 12, at least one computer unit (including memory elements such as microcomputers) 14 and at least one output circuit 16. The input circuit, microcomputer and output circuit are interconnected via a communication system 18 for the mutual exchange of data.

The following input lines are connected to the input circuit 12. Input lines 20 and 24 lead from respective first and second measuring units 22 and 26 for detecting first and second measurement quantities (wped1, wped2) for the accelerator pedal position. Input lines 36 to 40 are from measuring devices 42 to 46, respectively, which provide additional operating quantities of the drive unit and/or of the vehicle. These operating quantities are needed for carrying out the functions executed by the control apparatus 10 and include, in the case of the control of an internal combustion engine, the supplied air mass, the engine rpm, the temperature of the inducted air, the ambient pressure, et cetera.

The electronic control apparatus 10 controls actuators via the output circuit 16 in accordance with the detected measurement quantities and especially in accordance with at least one of the measurement quantities determined by the measurement devices 22 and/or 26. In the preferred embodiment of a control of an internal combustion engine, the charge of the engine is controlled by influencing the air supply of the engine via a throttle flap 48. In addition, the ignition time point 50 is adjusted, the metering of fuel 52 is influenced and/or a turbocharger 54 is controlled.

In the preferred embodiment, the redundantly detected measurement quantity is the position wped of an accelerator pedal. This redundant measurement quantity is evaluated in the control which is executed by the control apparatus 10. In the preferred embodiment, an actuator for the control of the engine is controlled by the control apparatus 10 on the basis of one of the measurement quantities; whereas, the other measurement quantity serves to monitor the correctness of the measurement quantity which forms the basis of the control function. In other embodiments, the actuator is controlled in dependence upon a value (mean value, maximum value or minimum value) which is derived from both quantities. What is essential is that both measurement quantities can change between a minimum value and a maximum value. At least one of the extreme values is changeable in dependence upon external conditions such as temperature, deterioration, et cetera. For this reason, and with a view as to the accuracy and reliability of the detection of the measurement quantities, a precise knowledge of at least one of the extreme values of the measurement quantities is required in the evaluation of the measurement quantities for control. This has special significance in the detection of the position of the accelerator pedal, brake pedal and/or the position of an actuator which can be actuated such as a throttle flap, charge flap, electric motor for the operating brakes, et cetera.

An imprecise adaptation of the evaluated measurement quantity (for example to the changing lower extreme value in the example of the measurement quantity for a released accelerator pedal) leads, as a rule, to an increased lost motion when the measurement quantity is only formed from the signal of the measuring device when this signal exceeds the lower extreme value. This dead region can be increased when a second measuring device is provided for monitoring the measurement quantity. The second measuring device makes the measuring quantity redundantly available but likewise burdened by tolerances when data are derived from the measurement quantities while considering the tolerances contained in the measurement signals. This derivation is made, for example, in the presence of the idle range, and the determination of the released accelerator pedal. This dead region is reduced by adapting the lower extreme values of the measurement quantities.

If potentiometers are utilized as measuring devices, then it must be additionally considered that abraded material of the potentiometer track can form at the reversal point of the potentiometer (for example, the stop point) and thereby form an increased transfer resistance between the track and the wiper contact which can lead to a temporary drop of the voltage value. An adaptation of this value as a lower extreme value would lead to the situation that the adaptation value is too low and that the data (which are derived from the measurement quantity and can, for example, be a released accelerator pedal) can no longer be formed when the contact resistance has again become less.

The procedure described below is utilized in combination with the detection of all measurement quantities in a vehicle which are characterized by at least one changing extreme value which is evaluated to form data for the control of the vehicle. In the preferred embodiment, the procedure is used in combination with potentiometers or contactless angle transducers. In angle transducers, the problematic of the excessive contact resistance does not occur. These transducers detect the position of an operator-controlled element (for example, accelerator pedal, brake pedal) and/or the position of an actuator in the vehicle (for example, the throttle flap, charge flap, brake actuator, et cetera).

Figure 2:
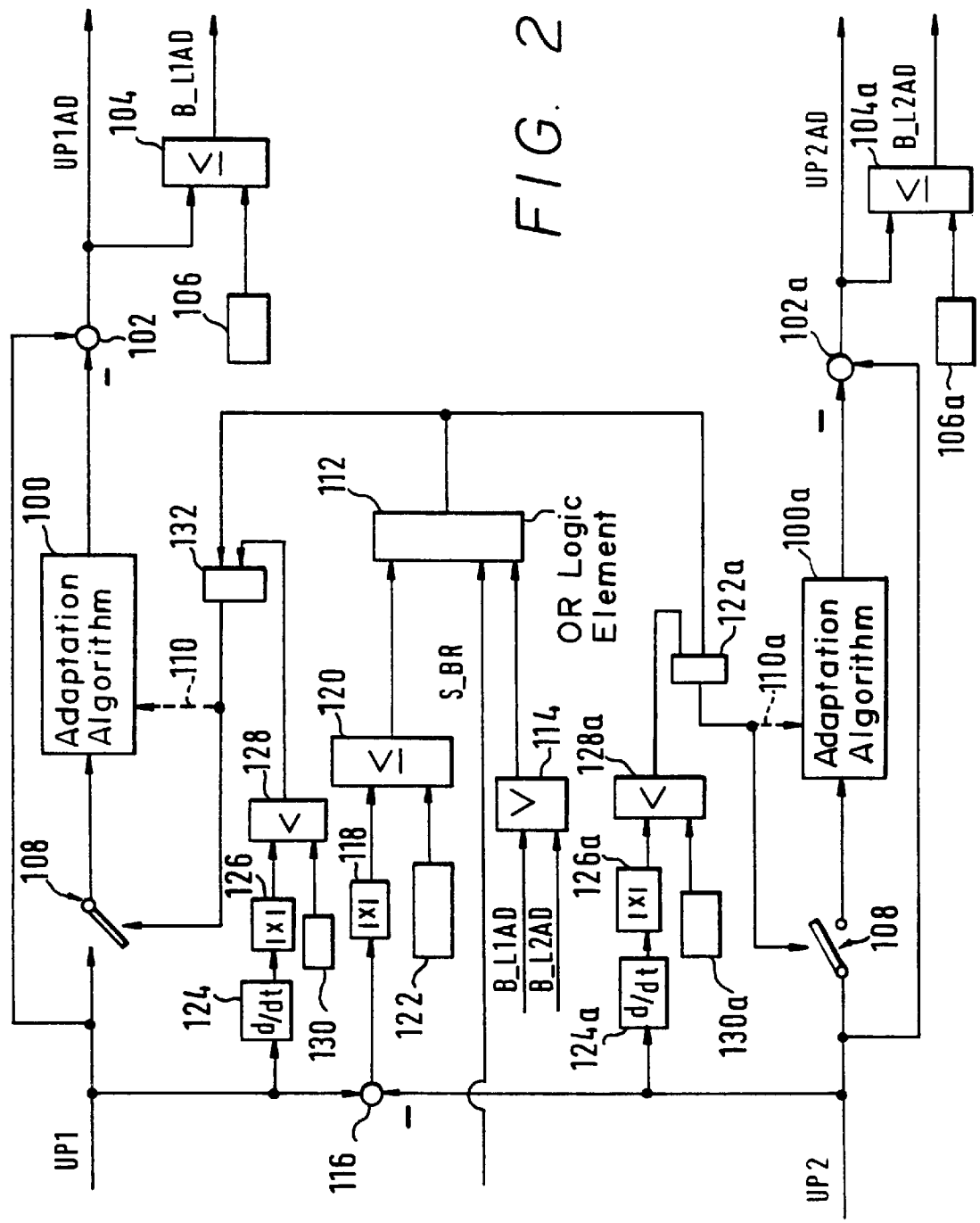
FIG. 2 is a first sequence diagram showing a first embodiment of the method of the invention which shows the detection of the measurement quantity and the adaptation of an extreme value in greater detail.

In FIG. 2, a sequence diagram is shown which describes a preferred procedure for the adaptation of an extreme value. The sequence diagram shows a preferred realization as a program of the microcomputer 14.

The extreme value of the measurement quantity is adapted via an integrator in the lowpass circuit. The adaptation is permitted when the adapted extreme value is reached up to a pregiven offset value or, independently therefrom, whether the brake pedal is actuated. The minimum values, which occur in the lowpass filtering, are taken up in a minimum value memory where they represent the adapted extreme value of the measurement quantity.

The stored minimum value is increased to the current value (which can therefore also be greater) when actuating the brake pedal whereby a rapid adaptation in the direction leading away from the extreme value is made possible. In addition thereto or as an alternative, when moving out of the adapted extreme value range, the adapted extreme value is increased by a slight amount so that an upward adaptation is possible even without actuating the brake pedal. A moving out of the adapted extreme value range takes place, for example, when a pregiven offset value is exceeded by the adapted extreme value.

The extreme values of both measurement quantities are adapted in this way independently of each other when making a redundant detection of the measurement quantities.

In the embodiment of FIG. 2, the two measurement quantities UP1 and UP2 are read in. The two measurement quantities are supplied to respective adaptation algorithms (100, 100a) when at least one of the conditions described below is present. This takes place in that essentially the measures noted above for determining and storing the adapted extreme values of the particular measurement quantities are carried out by means of an integrator connected as a lowpass. For forming the adapted measurement quantities, respective logic elements 102 and 102a are provided wherein the respective stored extreme values are logically coupled to the detected measurement quantities UP1 and UP2. Preferably, the extreme values are subtracted from the detected measurement quantities UP1 and UP2. In this way, the adapted measurement quantities UP1AD and UP2AD are formed. Furthermore, status signals B_L1AD and B_L2AD are determined on the basis of the adapted measurement values. These status signals are a measure for the reaching of the extreme value range by the measurement quantities. For this purpose, the adapted measurement quantities are supplied to respective comparators 104 and 104a wherein the adapted measurement quantity is compared to a predetermined limit value which is stored in the particular memory cell (106 or 106a). The status signal is set when there is a drop below this limit value and reset when this limit value is exceeded.

The adaptation algorithm (100 or 100a) is activated under predetermined conditions. This is symbolized in FIG. 2 by the switching element 108 or 108a or by the direct access of an activation signal to the adaptation algorithm (100 or 100a). Here, reference can be made to the broken lines 110, 110a. The adaptation is permitted when, at least on the basis of at least one measurement quantity, it has been determined that the extreme value range was reached and/or when the brake pedal is actuated and/or when the deviation between the two measurement quantities UP1 and UP2 drops below a predetermined limit value and/or when the gradient of at least one of the measurement quantities drops below a predetermined threshold value. An activation signal is, for example, formed in the OR logic element 112. This signal activates the adaptation of both measurement quantities. Thereafter, the adaptation is active when either a signal S_BR is present, which represents the actuation of the brake pedal, or at least one of the idle conditions B_L1AD or B_L2AD is satisfied or when the difference between the two measurement quantities drops below a predetermined value. The idle conditions B_L1AD and B_L2AD are determined on the basis of the adapted measurement quantities. The two extreme value signals B_L1AD and B_L2AD are logically coupled in the OR logic element 114. An activation signal is supplied to the OR logic element 112 when at least one of these signals is present. For checking the last-mentioned condition, the deviation between the two measurement quantities UP1 and UP2 is formed in the comparator 116 and the amount of this deviation is formed in an amount former 118. The amount of the deviation is compared to the pregiven limit value in the comparator 120. This limit value is stored in the memory cell 122. A signal is generated by the comparator 120 when the amount of the deviation drops below the limit value.

A further condition, which is checked additionally or alternatively to the above-mentioned conditions, is a monitoring of the gradients of the measurement quantities. This condition likewise leads to the activation or deactivation of the adaptation. For this purpose, a quantity is formed from each measurement quantity in a gradient former 124 or 124a and this quantity defines the time-dependent change of the measurement quantity. Each of the quantities formed in this manner is supplied to an amount former (126 or 126a). The magnitude of the gradient is compared to a limit value in a comparator (128 or 128a). The limit value is stored in a memory cell (130 or 130a). If the amount of the time-dependent change of the particular signal value is less than the limit value, then the adaptation is activated via the OR logic element (132 or 132a) or, when the limit value is exceeded by the gradient, the adaptation is suspended.

The adaptation is enabled with the presence of at least one of the above-mentioned conditions. The adaptation is suspended when the at least one of the conditions (or a combination of the conditions) is not present. Here, preferably only the downward adaptation and not the upward adaptation is suspended when the brake pedal is actuated or when there is a movement out of the extreme value range.

In the preferred embodiment, the adaptation is only permitted after there has been a movement out of the extreme value range at least once so that the adaptation is again possible with the next entry into the extreme value region. It is not the adapted limit value B_L1AD or B_L2AD which is used as the limit value for this limitation as to the enablement of the adaptation but a pregiven limit value to which the non-adapted measurement quantity UP1 or UP2 is compared.

It is common to all of the above-mentioned activation preconditions that, when they are present, one can assume that the measurement quantity is not influenced by factors which disturb the adaptation (defective conditions, acceleration, et cetera).

In the preferred embodiment, the adaptation takes place via an integrator whose output is subtracted from the input signal whereby a lowpass performance results. If the input signal of this lowpass is set to the value zero when one of the above conditions is no longer satisfied, then the value of the lowpass remains the same. The integration time constant of the integrator is changeable. When the brake pedal is actuated, a switchover from a slower to a more rapid time constant is made because then one can assume that the accelerator pedal is not actuated. Furthermore, the integrator is limited in the downward direction to a minimum tolerance value and, in the upward direction, to a maximum tolerance value.

The smallest value of the integrator is stored in a minimum value memory in the context of the adaptation. When activating the system (original start), this value is set to a pregiven maximum value. The stored value is set to the current value of the integrator when a brake pedal actuation signal is present. Additionally or alternatively, the adapted value is increased, preferably, to a value, which is derived from the adapted measurement quantity, when the adapted measurement quantity has become greater starting from lower values and a pregiven threshold value (for example, when leaving the zero point region) has been exceeded. This is only permitted again after a renewed reaching of the adapted extreme value region in order to prevent an unwanted uplearning.

In addition to the adapted idle condition and the adapted measurement quantity, in other embodiments, the absolute idle condition and the measurement quantity (not adapted) are themselves supplied. The idle condition is derived from the measurement quantity by a comparison to a pregiven limit value. The control of the vehicle and especially the driver command computation in the case of measurement quantities, which represent the accelerator pedal position, is then executed in dependence upon operating conditions on the basis of the adapted and/or the non-adapted quantities.

If potentiometers are used as measuring devices, then, in some embodiments, because of formation of an excess contact resistance between potentiometer track and wiper contact as a consequence of abraded material, the following problematic can result. It can happen that the measurement quantity of the potentiometer (monitoring potentiometer) lies on the lower tolerance limit and the measurement quantity of the other potentiometer (control potentiometer) lies on the upper tolerance limit. The correctness of the other potentiometer is monitored with the aid of the monitoring potentiometer and the measurement quantity of the other potentiometer forms the basis of the control function. The above leads to the condition that the reaching of the extreme value range is signalized by the measurement quantity of the monitoring potentiometer already with a position, in which the measurement quantity of the control potentiometer still displays relatively high values. This performance is unwanted because, under circumstances (for example, for increased contact resistances), reaching the extreme value range is detected when actually this region has not yet been reached.

Figure 3:
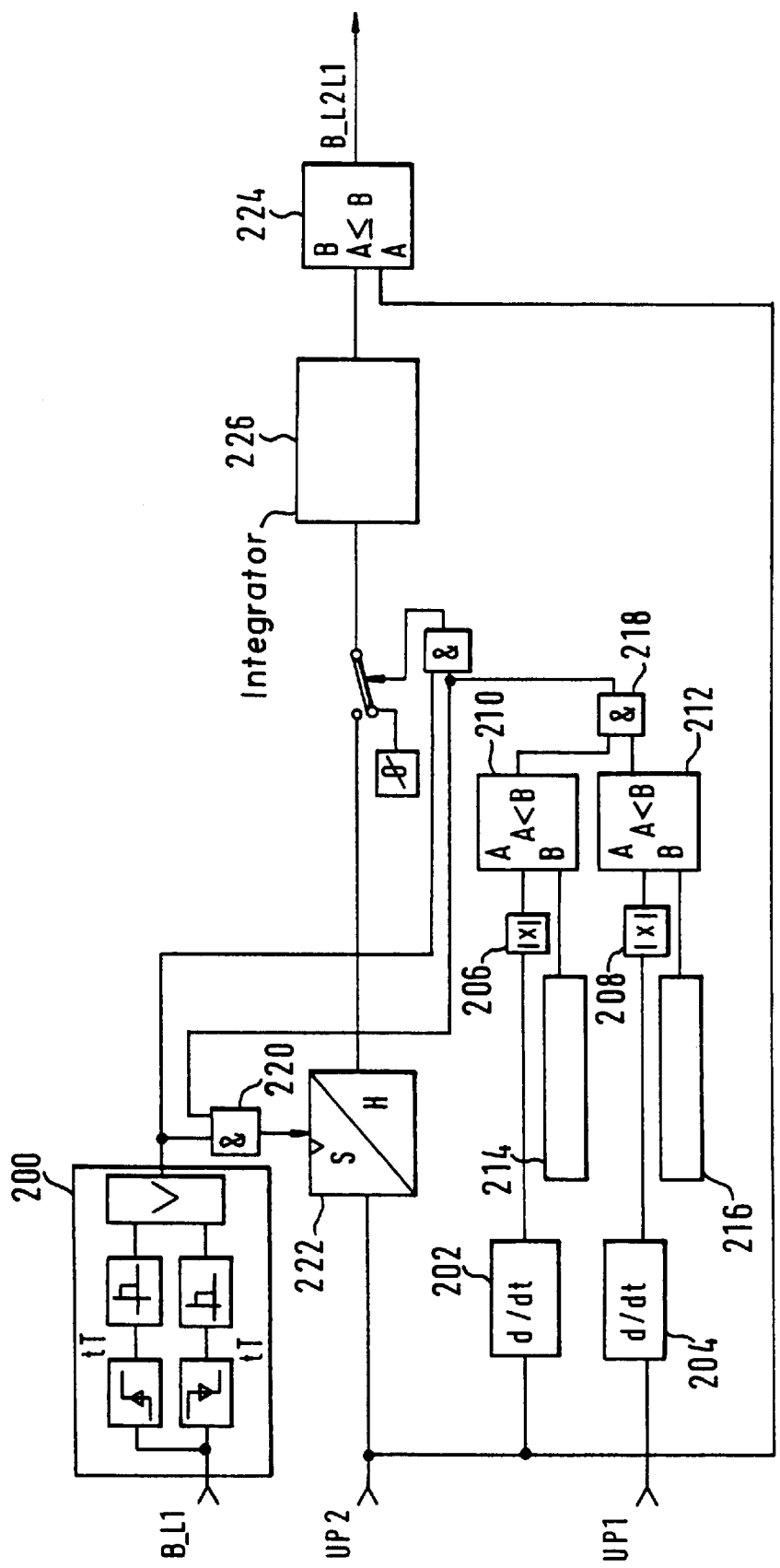
FIG. 3 is a sequence diagram of another embodiment of the invention.

In order to avoid this situation, as extreme value for the measurement quantity of the one potentiometer (preferably, the monitoring potentiometer), the upper limit of the extreme value range of the other measurement quantity (preferably of the control potentiometer) is determined and, from this value, a tight tolerance extreme value range B_L2L1 is formed for the measurement quantity of the one potentiometer which is not supported by an adaptation which could be made incorrect by contact resistances. This is shown in the sequence diagram of FIG. 3 in one embodiment.

When the measurement quantity UP1 of the first potentiometer drops below or exceeds a preset threshold value, a switching signal B_L1 is set. The value of the measurement quantity UP2 of the second potentiometer is stored with the positive or negative flank of the switching signal B_L1 (see block 200). The idle condition B_L2L1 is satisfied when the actual measurement quantity of the second potentiometer is below this stored value. In this way, the above-mentioned discrepancies as a consequence of the contact resistances in the region of the second potentiometer can no longer occur so that here too an adaptation is permitted when the measurement quantity with great probability is not influenced by factors disturbing the adaptation (here, the contact resistances, et cetera).

In the preferred embodiment, the measurement quantity value of the second potentiometer is detected in a simple sample and hold element 222. For this purpose, the gradients of the measurement quantities UP2 and UP1 are formed in the gradient formers 202 and 204, respectively; the magnitude of these quantities is determined in respective ones of the magnitude formers 206 and 208, respectively; and, these quantities are compared in the comparators 210 and 212, respectively, to limit values stored in memory cells 214 to 216. The current measurement quantity UP2 is kept in the sample-and-hold element 222 when both gradients (see AND logic element 218) drop below the predetermined limit value and (AND logic element 220) if a positive or negative flank of the switching signal B_L1 is present (measurement quantity of the first potentiometer has just reached the extreme value range or has just left the same). The kept value is the value of the measurement quantity of the second potentiometer which is present when the measurement quantity of the first potentiometer reaches or leaves the non-adapted extreme value range. The kept value is stored in an integrator 226 connected, for example, as a lowpass when the above-mentioned conditions are present. The stored extreme value is then compared to the measurement signal value UP2 (see comparator 224). The extreme value region status B_L2L1 is set when there is a drop below the limit value. If an integrator is used for storing the value, then this integrator is limited in the downward direction to the minimum tolerance value of the second potentiometer and the upper maximum value as well as the initialization value are set to a value which is formed from the maximum tolerance of the second potentiometer and the minimum tolerance of the first potentiometer. In this way, a reliable idle recognition is achieved by the second potentiometer when the transient condition for the adaptation is not yet complete.

Another realization is that, in lieu of the flank change of the switching signal, an inquiry is made as to whether the measurement quantity UP1 of the first potentiometer is in a predetermined region about the maximum extreme value thereof. If this is recognized and if the other above-mentioned conditions are satisfied, the adaptation of the measurement quantity via the above-described integrator is enabled. This leads to a more rapid transient performance when there is a quasi-constant accelerator pedal position in the vicinity of the maximum value of the zero region of the first potentiometer.

With the nature of the adaptation described above, the influence of the contact resistances on the second potentiometer is substantially precluded because the learned extreme value, as a rule, does not lie at the actual extreme value and therefore at the turning point whereat increased abraded material occurs.

A residual risk for making the extreme adaptation incorrect occurs when the maximum value of the measurement quantity of the first potentiometer reaches the actual extreme value with this maximum value delimiting the zero region. In order to avoid this residual risk, the adapted value can be reduced by contact resistances on the second potentiometer. An idle condition is no longer recognized when these contact resistances later vanish. This is circumvented in that the extreme value of the second potentiometer is not learned directly in the maximum extreme value of the first potentiometer but somewhat higher. For this purpose, the inquiry is carried out to a value region lying above the maximum extreme value in the above last-described method.

Finally, the reliability of the extreme value adaptation is established in that the status signal is formed via reaching the zero region from an OR circuit of the adapted extreme values of both measurement quantities so that a double error from two like contact resistances on both potentiometers must be present which are no longer present when next reaching the zero region in order to prevent forming the status signal. For this case, the rapid upward adaptation for actuated brakes is provided which reliably ensures a reaching of the extreme value.

Different limit values for the extreme value range are made available by the procedure described above. Functions in accordance with this procedure can be activated for the second potentiometer so that an improved, more reliable recognition of the reaching of the extreme value region (idle recognition) can be achieved. These functions are activated in dependence upon: absolute thresholds, adapted thresholds or the narrowed threshold value.

Figure 4:
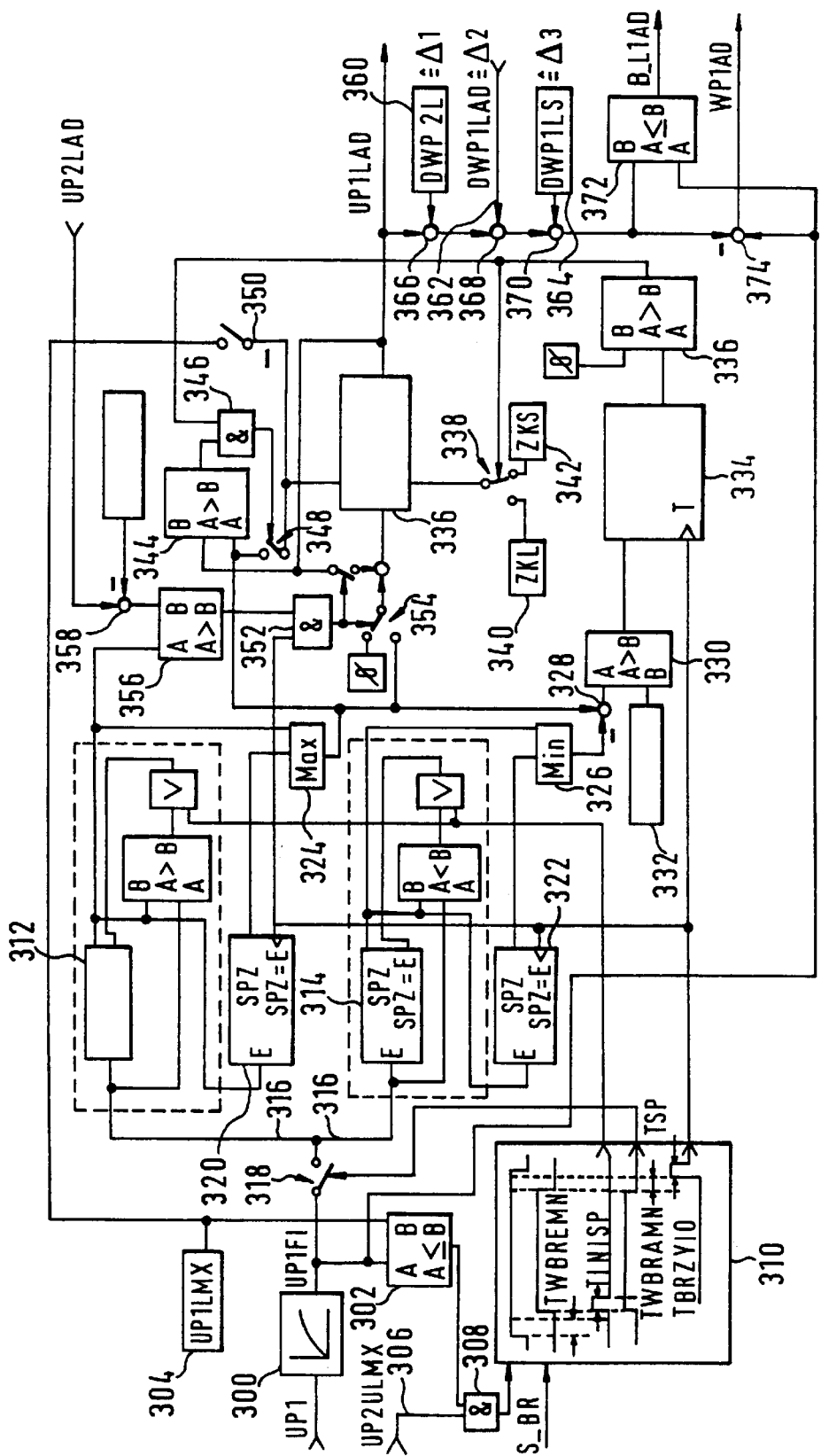
FIG. 4 is another sequence diagram of another embodiment of the invention.
Figure 5:
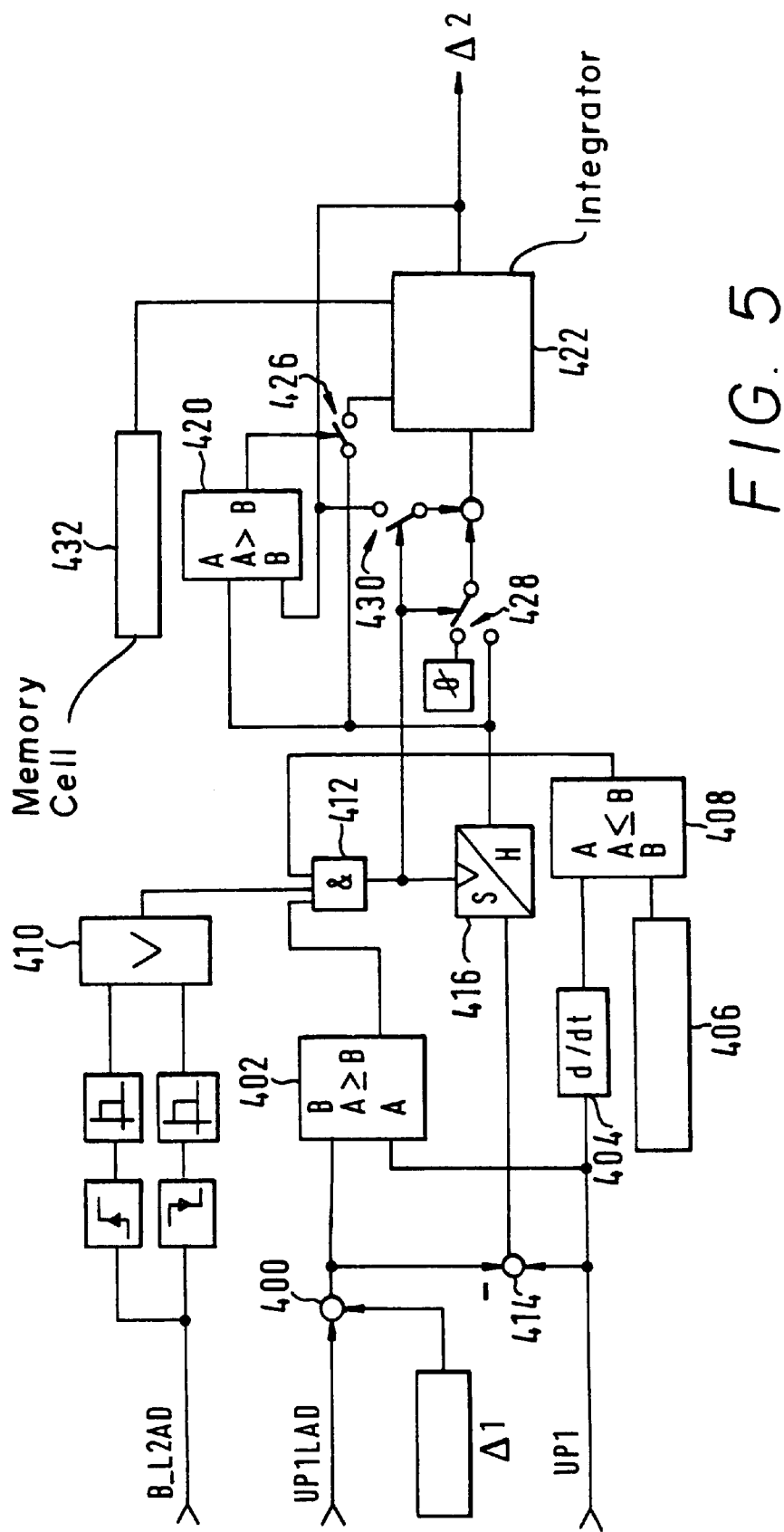
FIG. 5 is still another sequence diagram of still another embodiment of the method of the invention; and, FIG. 6 is a graph showing the characteristic lines of respective measurement quantities UP1 and UP2 as a function of the rotational angle α of the accelerator pedal.

In FIGS. 4 and 5, sequence diagrams are shown which show further embodiments of the above-described measurement quantity adaptation.

These embodiments afford the advantage that they ensure an adapted measurement quantity as a guide quantity for the control with the least possible lost motion in the presence of contact resistance effects. In addition, a two-channel idle recognition is ensured on the second potentiometer without an idle recognition which is too early so that no negative influences occur on the driving performance. The cases of a defective adaptation are caught because of the additional use of a monitoring rpm limiter. These cases have a very slight probability.

The essence of the procedure shown in FIGS. 4 and 5 is that learning is not done with the entry into the adapted extreme value region (in the following referred to as that idle range). Instead, learning takes place only with the stepped-on brake pedal. In the normal case, the driver has the foot off the accelerator pedal. It is therefore possible to execute an adaptation of the measurement quantities of both potentiometers as described above which has as its target to disregard a reduction of the threshold value for idle recognition as a consequence of contact resistances and to determine the particular characteristic line end point without contact resistances. In order to achieve this, the minimum and maximum values of each potentiometer are evaluated in sequential braking cycles. A conclusion can be drawn as to a potentiometer without increased contact resistance when there is a slight scattering between the minimum and maximum values. For a large scattering, an increased contact resistance is assumed and only a very slow downward adaptation is still permitted. In both cases, an unfiltered boosting of the adaptation value occurs when, in a brake cycle, a maximum value occurs which is greater than the adapted value. An erroneous adaptation can occur by increasing the fuel while actuating the brake pedal. To substantially prevent this erroneous adaptation, the adaptation takes place only in a braking cycle wherein the accelerator pedal is first in the idle range and then the brake pedal is actuated and thereafter the accelerator pedal is still, at least for a minimum time, in idle.

FIG. 4 is a sequence diagram, which shows a preferred realization of the procedure as a program of the microcomputer 14, for the example of an adaptation of one of the two potentiometers (potentiometer 1). A corresponding procedure is followed for the second potentiometer. Here too, the extreme values of the two potentiometers are evaluated separately and adapted.

The signal evaluation takes place only after a valid brake cycle has been run through, that is, an actuation of the brake pedal is assumed only after a pregiven time after there has been a drop below both idle threshold values of the potentiometers and a release of the brake pedal must take place at a specific time in advance of exceeding these thresholds. This prevents an erroneous adaptation when actuating the accelerator pedal while the brake pedal is still actuated. A renewed brake cycle is recognized when the idle thresholds of the potentiometers have been exceeded and thereafter there is again a drop therebelow. In this way, a multiple evaluation of the same potentiometer condition is prevented. To recognize scattering, the stored minimal and maximum values of both potentiometers are evaluated in the current brake cycle and a past brake cycle. For a scattering below the threshold value (that is, when no increased contact resistance is to be assumed), a rapid downward adaptation to the actual maximum value while the brake is pressed is permitted. If the new maximum value is greater than the stored extreme value, then the extreme value is immediately reset higher to the maximum value. For scattering above the threshold value (that is, when increased contact resistance is present), a downward adaptation to lower maximum values is permitted only very slowly. An immediate upward setting likewise takes place when a new maximum value is greater than the stored adaptation value. An upward/downward counter functions to switch over to a rapid downward adaptation after a few brake cycles when there is only a one-time scattering above the threshold value. A switchover to a rapid downward adaptation only takes place after many brake cycles with a scattering below the threshold value when several brake cycles were previously detected with a scattering above the threshold value. A change of the adapted measuring quantity takes place only when the idle state is recognized so that no unevenness in the torque input for the drive unit of the vehicle results. This torque input is determined in the preferred embodiment by evaluating the potentiometer signal.

According to the sequence diagram of FIG. 4, the signal of the first potentiometer UP1 is detected and filtered to the filtered signal UP1FI in filter 300. The filtered signal is compared to the maximum value of the extreme value region UP1LMX in the comparator 302. The maximum value is pregiven in the memory cell 304. If the filtered signal is below the maximum value and the corresponding condition applies also for the second potentiometer (transmission via connection 306, logic coupling in the AND connection 308), then the evaluation of the brake pedal signal 310 becomes active.

The positive flank of the brake pedal actuating signal S_BR is not permitted to come before a minimum time TWBREMN after satisfying the condition checked in AND logic element 308. With the positive flank of the accelerator pedal actuation signal S_BR, a pulse is generated to initialize the minimum value storage 312 and the maximum value storage 314 (TINISP pulse). Furthermore, with the recognition of the brake actuation, a signal TSP is set with which the minimum value storage and the maximum value storage are activated. The symbolically shown switching element 318 is closed for the duration of the brake pedal actuation because of this signal. The initialization of the memories then takes place with the current filtered value UP1FI (see logic connection 316).

The signal for activating the storage ends with the rear flank of the brake actuating signal. After the elapse of a waiting time after the termination of the brake pedal actuating signal, a further pulse TBRZYIO is set which indicates that the brake cycle for the storage was in order, that is, the above-described conditions were satisfied. During the time TSP, the minimum value and maximum value of the filtered potentiometer voltage are held in the minimum value memory 312 and the maximum value memory 314, respectively. The stored values are copied into the memories 320 and 322, respectively, at the termination of the brake cycle and the occurrence of the pulse indicating the correct brake cycle. With the next brake cycle, the minimum values and the maximum values of the current and of the past cycles are present in these respective memory cells. The maximum and the minimum of these respective values are formed and the difference is formed therefrom as a signal scattering. This is shown in the sequence diagram of FIG. 4 by the maximum value selection stage 324 and the minimum value selection stage 326, respectively, the comparator position 328 and the comparator 330 wherein the difference is compared with the pregiven threshold value which is stored in the memory cell 332. If the comparison 330 shows that the difference of the maximum and minimum values from this brake cycle and the last brake cycle exceed the permissible threshold value, then the counter 334 is incremented up, otherwise, the counter is decremented. If the counter has a value greater than zero, then the time constant for the adaptation (integrator 336) is switched to a slower value and for a value of zero or below zero, the switch is to a faster value. In this way, the speed of the downward adaptation is influenced by the integrator 336. In the sequence diagram of FIG. 4, a comparison of the count is undertaken to the value zero in the comparator 336 and, in dependence upon the result, the switching element 338 is switched over between the slow time constant 340 and the rapid time constant 342. Likewise, for a count of the counter greater than zero, the condition for an immediate incrementing of the integrator to a new maximum value is satisfied when this maximum value is greater than the stored adaptation value UP1LAD. This takes place in the comparator stage 344 in which the maximum value is compared to the adaptation value (output value of the integrator) and, for a maximum value greater than the adaptation value, the integrator is set to the value of the maximum value via the AND connection 346 and the switching element 348. For a power failure, the integrator is set to the pregiven maximum value UP1LMX (see connection 350) and the integrator is limited also with respect to the upward adaptation or the incrementing to this maximum value. When the counter has the value zero, the integrator runs as a lowpass which always scans with the positive flank of the pulse the particular newest maximum value as input signal (see AND logic connection 352, switching element 354). The positive flank of the pulse indicates a correct brake cycle. In the preferred embodiment, this takes place only when the stored maximum value is greater than the adaptation value of the second potentiometer from which a pregiven value is subtracted (see comparator 356, comparator location 358, AND connection 352).

The start of the adaptation takes place with the idle maximum values of the two potentiometers after the power failure. A transition to the rapid downward adaptation takes place only after a minimum number of brake cycles without a scattering greater than the threshold value. Furthermore, a limiting of the adaptation region takes place to minimum and maximum idle tolerance limits, respectively, for the two potentiometers. Furthermore, a limiting of the particular adaptation value to the value of the other adaptation value takes place minus maximum synchronism tolerances.

The integrator output defines the adapted idle value UP1LAD. Values $\Delta 1$, $\Delta 2$ and $\Delta 3$ are added to this adapted idle value UP1LAD (see memory cells 360, connection 362, memory cell 364 and logic connection elements 366, 368 and 370). The sum of the adaptation value and these three values is compared to the filtered potentiometer value UP1FI (see element 372). The idle condition B_L1AD is set when the measured value drops below the adaptation value increased by the above-mentioned factors.

Furthermore, the increased adaptation value is subtracted from the measurement value in the subtraction element 374 whereby the rescaled characteristic line value WPLAD results which is described hereinafter.

A procedure corresponding to that shown in FIG. 4 takes place also with respect to the adaptation of the second potentiometer.

The formed, adapted signals are the basis of the scaling of the characteristic line, the measurement quantity derived from the potentiometer signal and the idle recognition. In the preferred embodiment, the first potentiometer is the lead potentiometer, that is, this potentiometer specifies the measurement quantity and must recognize the idle condition before the idle recognition on the basis of the measurement quantity of the second potentiometer. The adapted idle range for the measurement quantity of the second potentiometer is limited by the adapted value plus an addition value $\Delta 1$. The adapted idle range for the first potentiometer is limited by the adapted value plus the values $\Delta 1$, $\Delta 2$ and $\Delta 3$. $\Delta 2$ is an incremental value which, for example, can be adapted on the basis of the adaptation described hereinafter and avoids a recognition of idle which is too early by the second potentiometer because of contact resistances or because of differences in linearity between the two potentiometers. The adaptation value $\Delta 3$ is an additional safety spacing for the idle recognition which ensures that idle is recognized on the basis of the first potentiometer measurement quantity in advance of the idle recognition on the basis of the measurement quantity of the second potentiometer. A two-channel idle recognition is made possible by the separate adaptation for the two measurement quantities because idle is recognized when the idle condition is satisfied either on the basis of the first measurement quantity or on the basis of the second measurement quantity. Furthermore, an adapted scaling of the characteristic line takes place at the end of the idle range of the first potentiometer in that the increased adaptation value is subtracted from the measurement quantity of this potentiometer. Furthermore, an idle recognition on the basis of absolute, non-adapted values is made available. Idle is detected when the particular measurement quantity value drops below a pregiven tolerance value which represents a maximum idle range limit. The idle recognition is utilized when one of the potentiometers is defective and the control takes place with the correctly operating potentiometer or, when an error is detected in the brake pedal signal, the control is carried out on the basis of the measurement quantity of the first potentiometer.

In this embodiment too, a tracking of the idle limit value takes place for the measurement quantity of a potentiometer to the idle limit value for the measurement quantity of the other potentiometer. This takes place via adaptation of the factor $\Delta 2$. A sequence diagram for a preferred realization is shown in FIG. 5. For this purpose, the adapted measurement quantity UP1LAD is increased in the addition element 400 by the value Δ1. The measurement quantity, which is increased in this way, is compared to the absolute measurement quantity UP1 in the comparator 402. If this measurement quantity is greater than the increased adapted measurement quantity value and, if simultaneously, the gradient of the measurement quantity is less than a pregiven value (see 408), then the difference between the increased adapted measurement quantity value and the measurement quantity is kept in the sample-and-hold circuit 416 when there is a positive or negative flank of the switching signal for the adapted idle condition of the second potentiometer (410 and logic element 412). The gradient of the measurement quantity is formed in gradient former 404 and the pregiven value is stored in the memory cell 406 and the difference is formed in the logic element 414. If this difference is greater than the adapted value Δ2 (see comparator 420), an integrator 422 is immediately incremented to this value (see switching element 426). Otherwise, the integrator forms the mean value of Δ2 (see switching elements 428, 430, feedback of the output signal Δ2 to the input of the integrator). The mean value is then limited to a maximum value (memory cell 432).

In another embodiment, the absolute value of the measurement quantity of the first potentiometer is adapted at the end of the idle range of the measurement quantity of the second potentiometer and this value is limited to a maximum value which is derived from the adapted measurement quantity of the first potentiometer. From this, the value Δ2 is computed.

Figure 6:
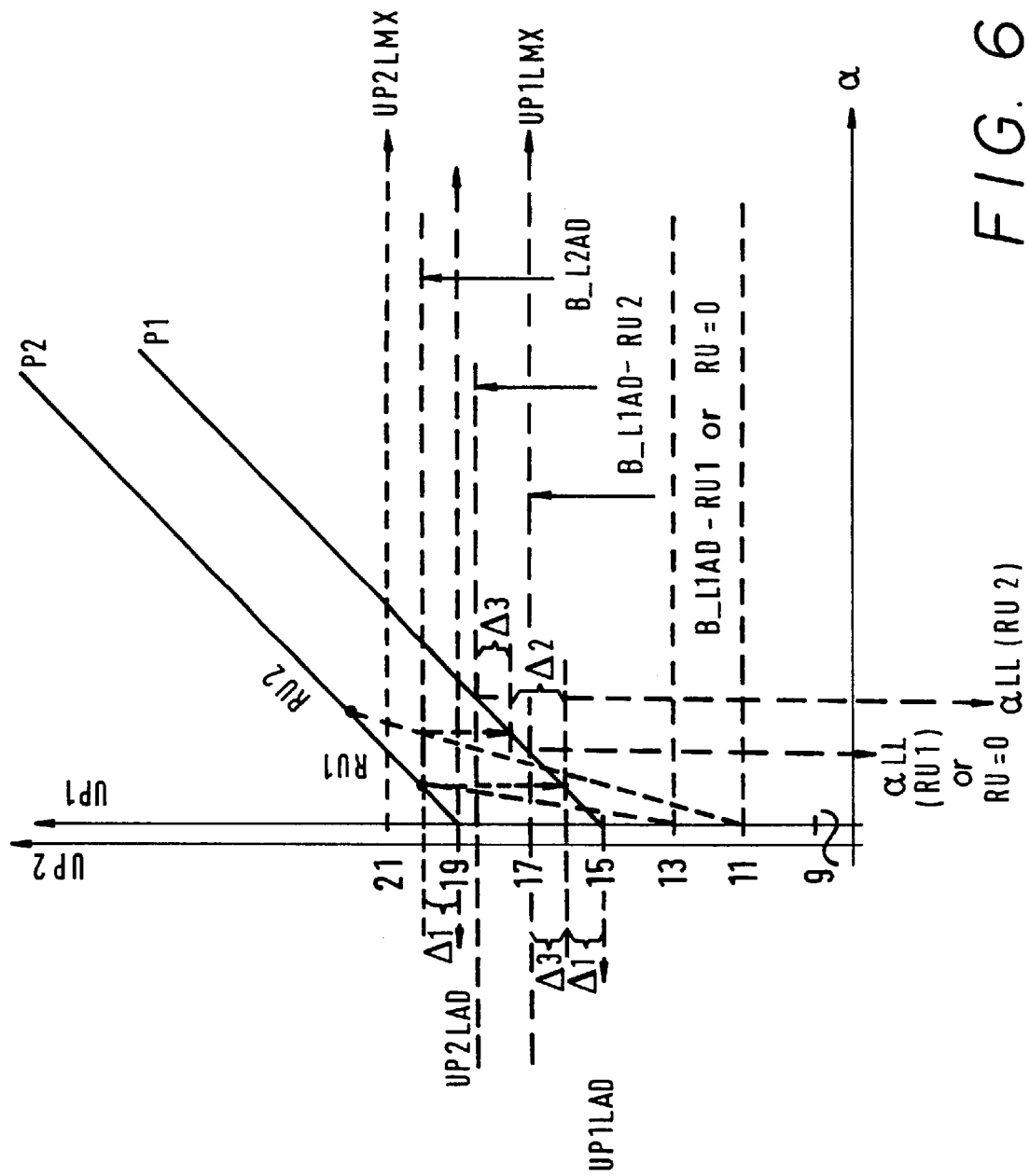

FIG. 6 shows the characteristic line for the measurement quantities UP1 and UP2 as a function of rotational angle Δ of the accelerator pedal. A characteristic line of the first potentiometer P1 and a characteristic line of the second potentiometer P2 are shown in FIG. 6. In addition, two different contact resistances RU1 and RU2 on potentiometer 2 are shown. The maximum limit values UP2LMX and UP1LMX for the idle ranges are fixed at 21% and 17%, respectively, of the measurement quantity. Furthermore, examples for the minimum and maximum adaptation values at the potentiometer 2 are plotted with and without contact resistances. Furthermore, the adapted value UP1LAD and the adapted value UP2LAD are each shown without contact resistance. The recognition on the potentiometer 1 always takes place in advance of the recognition on potentiometer 2 because of the increase of the particular adaptation value by the values Δ1, Δ2 and Δ3 (see αLL). Under unfavorable circumstances, the idle limit at P2 could be reached ahead of the idle limit at P1 in the embodiment described (see RU2, B_RL2AD, B_RL1ADRU1). To avoid this, the idle range for the measurement quantity of P1 is increased by the adaptable factor Δ2.

A monitoring rpm limiter is provided for further improving reliability. This monitoring rpm limiter limits the rpm of the drive unit of the vehicle to a pregiven limit value when idle is recognized. The monitoring rpm limiter also intervenes with the brake depressed even when: both adaptation values wander downwardly with erroneously low maximum values made incorrect repeatedly over many brake cycles by contact resistances at both potentiometers; both contact resistances at the two potentiometers simultaneously vanish in a subsequent idle cycle; and, the potentiometer voltages lie above the idle range. The monitoring rpm limiter is activated without brake actuation when there is a recognized adapted idle condition at one of the two measurement quantities or, for an actuated brake, when the idle condition is satisfied on the basis of the absolute, non-adapted measurement quantities of one of the two potentiometers.

It is understood that the foregoing description is that of the preferred embodiments of the invention and that various changes and modifications may be made thereto without departing from the spirit and scope of the invention as defined in the appended claims.

What is claimed is:

1. A method for detecting a measurement quantity in a motor vehicle, the measurement quantity having an extreme value, the method comprising the steps of:
   detecting said measurement quantity;
   evaluating said measurement quantity while considering said extreme value for control in combination with the vehicle;
   enabling an adaptation of said extreme value only under pregiven conditions which, when present, virtually ensure that said measurement quantity is unaffected by factors which make said measurement quantity incorrect; and,
   adapting said extreme value.

2. The method of claim 1, wherein said measurement quantity is detected as a first measurement quantity; and, the method comprising the further steps of: redundantly detecting said measurement quantity as a second measurement quantity and adapting said extreme value independently for both of said first and second measurement quantities.

3. The method of claim 1, comprising the further step of deriving a threshold value from the adapted extreme value; and, providing an indication that the range of said extreme value has been reached when said measurement quantity has exceeded or dropped below said threshold value.

4. The method of claim 1, comprising the further step of enabling the adaptation when said measurement quantity lies below a maximum tolerance value and/or above a minimum tolerance value.

5. The method of claim 1, comprising the further step of enabling the adaptation when the gradient of the measurement quantity has dropped below a specific threshold.

6. The method of claim 2, comprising the further step of enabling the adaptation when the two measurement quantities lie next to each other within a pregiven range of tolerance values.

7. The method of claim 1, wherein the vehicle includes a brake pedal; and, the method comprising the further step of enabling the adaptation when the brake pedal is actuated.

8. The method of claim 7, wherein a transducer supplies a brake pedal actuation signal when the brake pedal is actuated; and, the adaptation takes place with a predetermined time constant which is affected by the brake pedal actuation signal; and, the adaptation takes place more rapidly when the brake pedal actuation signal is present.

9. The method of claim 1, wherein said measurement quantity is detected as a first measurement quantity; and, the method comprising the further step of redundantly detecting said measurement quantity as a second measurement quantity and enabling the adaptation of the one extreme value when said first measurement quantity has reached a predetermined threshold value.

10. The method of claim 9, wherein said predetermined threshold value is the maximum limit value for the extreme value range thereof.

11. The method of claim 10, wherein reaching said extreme value range is recognized when this measurement quantity has dropped below the adapted value.

12. The method of claim 1, wherein said measurement quantity has maximum and/or minimum values; and, the maximum values and/or the minimum values of said measurement quantity are detected when at least one of said pregiven conditions is present.

13. The method of claim 1, wherein the largest measurement quantity value, which is present when there is a braking action, is detected as an adapted extreme value.

14. The method of claim 1, wherein the scattering between minimum and maximum values of the measurement quantity during an actual braking operation and during at least one previous braking operation is evaluated.

15. The method of claim 14, wherein the determination of the extreme value is dependent upon the magnitude of the scattering.

16. The method of claim 14, wherein:

a larger maximum value is assumed as the extreme value when too great a scattering is recognized at least once;

an adaptation of the extreme value in the direction of lower maximum values takes place slowly or not at all when the scattering is too great over several braking operations; and, a more rapid adaptation takes place to the mean value and/or the highest of the last maximum values and/or by filtering the determined maximum value when there is a scattering below a limit value.

17. The method of claim 1, wherein:

a limit value is formed from the adapted extreme value for the extreme value range;

to adapt the extreme value range of a first measurement quantity to the extreme value range of a second measurement quantity, the first measurement quantity is stored when the second measurement quantity has reached its extreme value range; and, the deviation between the stored measurement quantity and the limit value for the extreme value range of the first measurement quantity is determined and is added to the previous extreme value range for the formation of an increased extreme value range.

18. An arrangement for detecting a measurement quantity in a motor vehicle which has at least one extreme value, the arrangement comprising:

a control apparatus including: an input circuit for detecting the measurement quantity; and, an output circuit for outputting actuating signals for controlling the vehicle;

said control apparatus further including a computer unit which functions to evaluate the detected measurement quantity for forming the actuating signals while considering the extreme value of the measurement quantity; and, said computer unit having at least one program which enables an adaptation of the extreme value only under pregiven conditions which, when present, virtually ensures that said measurement quantity is unaffected by factors which make said measurement quantity incorrect.

* * * * *